United States Patent [19]

Izumi et al.

[11] 4,416,192

[45] Nov. 22, 1983

[54] MULTI-DIRECTIONAL NOZZLE ASSEMBLY FOR A FLUID DISPENSING DUCT SYSTEM

[75] Inventors: Masao Izumi, Fujisawa; Hiroshi Yoshida, Zama, both of Japan

[73] Assignee: Nissan Motor, Company, Limited, Kanagawa, Japan

[21] Appl. No.: 324,429

[22] Filed: Nov. 24, 1981

[30] Foreign Application Priority Data

Nov. 26, 1980 [JP] Japan ................................ 55/165287

[51] Int. Cl.³ .......................................... F24F 13/062
[52] U.S. Cl. ........................................ 98/40 N; 98/2; 239/397; 239/434
[58] Field of Search ................. 98/2, 2.08, 2.09, 40 R, 98/40 E, 40 N; 239/391, 397, 433, 434, 428

[56] References Cited

FOREIGN PATENT DOCUMENTS

2065293 6/1981 United Kingdom .................. 98/2.08

*Primary Examiner*—Albert J. Makay
*Assistant Examiner*—Harold Joyce

[57] ABSTRACT

A multi-directional nozzle assembly for a fluid dispensing duct system, comprising a housing structure having at least three discrete sections arranged in parallel in a lateral direction of the housing structure and consisting of first and second sections respectively constituted by the outermost two of the three sections and a third section constituted by the remaining one of the three sections, wherein each of the first and second sections is arranged to be capable of horizontally deflecting a flow of air to be discharged therefrom while the third section has detachably fitted therein a nozzle unit adapted to deflect a flow of air either horizontally or vertically.

2 Claims, 8 Drawing Figures

MULTI-DIRECTIONAL NOZZLE ASSEMBLY FOR A FLUID DISPENSING DUCT SYSTEM

FIELD OF THE INVENTION

The present invention relates to a multi-directional nozzle assembly for a fluid dispensing duct system of, for example, an automotive air conditioner or an air conditioning system for installation in an office or residential building.

SUMMARY OF THE INVENTION

In accordance with the present invention, there is provided a nozzle assembly which comprises a housing structure having first, second and third directions perpendicular to one another and at least three hollow sections separate from each other in the first direction of the housing structure and consisting of first and second sections respectively constituted by the outer two of the three sections and a third section constituted by the remaining one of the three sections, each of the sections having fluid inlet and outlet ends in directions parallel to the second direction of the housing structure, each of the first and second sections having a fluid dispensing passageway extending between the fluid inlet and outlet ends of the section and having on a plane parallel with the first and second directions of the housing structure a cross section flaring toward the fluid outlet end of the section and first and second control fluid chambers spaced apart from each other across the fluid dispensing passageway in direction parallel with the first direction of the housing structure, the respective first control fluid chambers of the first and second sections being disposed remoter from the third section than the respective second control fluid chambers of the first and second sections in the first direction of the housing structure, the housing structure further having in each of the first and second sections a pair of slots providing communication between the fluid dispensing passageway and the first and second control fluid chambers, respectively, of each of the first and second sections in directions parallel with the first direction of the housing structure, a fluid inlet opening for allowing the first control fluid chamber to be open at the fluid inlet end of each of the first and second sections, a first fluid distribution passageway providing communication between the first control fluid chamber of the first section and the second control fluid chamber of the second section, a second fluid distribution passageway providing communication between the first control fluid chamber of the second section and the second control fluid chamber of the first section, a first pair of openings each for providing communication between the first fluid distribution passageway and the third section, a second pair of openings each for providing communication between the second fluid distribution passageway and the third section, a first valve unit provided in conjunction with the first section and operative to close the fluid inlet opening of the first section, a second valve unit provided in conjunction with the second section and operative to close the fluid inlet opening of the second section, and at least one nozzle unit detachably fitted in the third section and having fluid inlet and outlet ends at the fluid inlet and outlet ends, respectively, of the third section, a fluid dispensing passageway extending between the fluid inlet and outlet ends of the nozzle unit and having on a plane parallel with the second direction and one of the first and third directions of the housing structure a cross section flaring toward the fluid outlet end of the nozzle unit, a pair of control fluid chambers spaced apart from each other across the fluid dispensing passageway of the nozzle unit in direction parallel with one of the first and third directions of the housing structure, a pair of slots providing communication between the fluid dispensing passageway and the control fluid chambers of the nozzle unit in directions parallel with one of the first and third directions of the housing structure, a first pair of openings each for providing communication between the above mentioned first fluid distribution passageway and one of the control fluid chambers of the nozzle unit, and a second pair of openings each for providing communication between the above mentioned second fluid distribution passageway and the other of the control fluid chambers of the nozzle unit, the nozzle unit being detachable from the housing structure and selectively assumable in the third section a first position having the fluid dispensing passageway of the nozzle unit flaring toward the fluid outlet end of the nozzle unit on a plane parallel with the second and third directions of the housing structure and a second position having the fluid dispensing passageway of the nozzle unit flaring toward the fluid outlet end of the nozzle unit on a plane parallel with the first and second directions of the housing structure. The above mentioned first, second and third directions of the housing structure may be lateral, fore-and-aft and vertical directions, respectively, of the housing structure.

BRIEF DESCRIPTION OF THE DRAWINGS

Drawbacks of a prior-art nozzle assembly of the nature to which the present invention generally appertains and detailed features and advantages of a multi-directional nozzle assembly according to the present invention will be understood from the following description taken in conjunction with the accompanying drawings, in which.

BACKGROUND OF THE INVENTION

Figure 1:
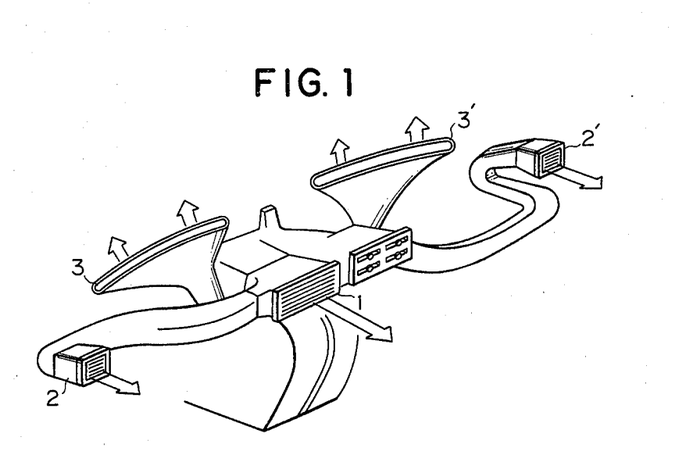
FIG. 1 is a schematic perspective view showing a duct system forming part of an automotive air conditioner.

In the description to follow, a multi-directional nozzle assembly to which the present invention appertains is assumed, by way of example, as being part of an air conditioning duct system for use in an automotive vehicle. In FIG. 1 of the drawings, a known example of such a duct system is shown comprising a center ventilator nozzle 1, a pair of side ventilator nozzles 2 and 2', and a pair of defroster nozzles 3 and 3'. Though not shown in the drawings, the center ventilator nozzle 1 and the side ventilator nozzles 2 and 2' are open in front of the driver's seat of an automotive vehicle and are arranged on central and side end portions, respectively, of the instrument panel of the vehicle. The defroster nozzles 3 and 3' are open upwardly inside the front windshield of the vehicle.

Figure 2:
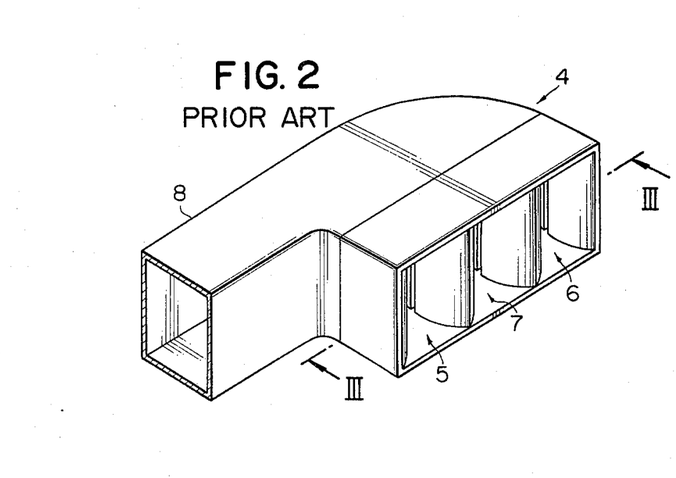
FIG. 2 is a perspective view showing a known nozzle assembly included in the duct system illustrated in FIG. 1.

On the nozzles thus arranged of the automotive air conditioning duct system, the side ventilator nozzle 2 for example comprises a nozzle structure 4 having horizontally juxtaposed three nozzle sections consisting of first and second nozzle sections 5 and 6 spaced apart from each other and a third nozzle section 7 formed between the first and second nozzle sections 5 and 6, as shown in FIG. 2. The first, second and third nozzle sections 5, 6 and 7 jointly communicate with a duct 8 and are individually open rearwardly on the instrument panel (not shown) of the automotive vehicle. As illustrated to an enlarged scale in FIG. 3 of the drawings, each of the nozzle sections 5, 6 and 7 has a fluid dispensing passageway 9 and a pair of control fluid chambers 10 and 10' formed on both sides of the fluid dispensing passageway 9. The fluid dispensing passageway 9 thus horizontally intervening between the two control fluid chambers 10 and 10' in each of the nozzle sections 5, 6 and 7 has a horizontal cross section flaring toward the fluid outlet end thereof and is constantly open upstream to the duct 8. The control fluid chambers 10 and 10' in each nozzle section are laterally open to the fluid dispensing passageway 9 through slots 11 and 11', respectively, which are located adjacent the fluid inlet end of the passageway 9. The lefthand control fluid chamber 10 of the nozzle section 5 is communicable with the duct 8 through an opening 12, while the second control fluid chamber 10' of the second nozzle section 6 is communicable with the duct 8 through an opening 12' as shown. The opening 12 is made open and closed by means of a first solenoid-operated control valve 13 positioned within the control fluid chamber 10 of the nozzle section 5 and, likewise, the opening 12' is made open and closed by means of a second solenoid-operated control valve 13' positioned within the fluid chamber 10' of the nozzle section 6. Furthermore, the lefthand control fluid chamber 10 of the first nozzle section 5 communicates with the respective lefthand control fluid chambers 10 of the second and third nozzle sections 6 and 7 through a first control fluid distribution passageway P as indicated by broken lines. Similarly, the righthand control fluid chamber 10' of the second nozzle section 6 communicates with the respective righthand control fluid chambers 10' of the first and second nozzle sections 5 and 6 through a second control fluid distribution passageway P' as also indicated by broken lines. The duct 8 terminating in the nozzle 2 thus constructed and arranged leads from a suitable source of forced flow of air such as a motor-driven fan (not shown) of an automotive air conditioning system.

Figure 3:
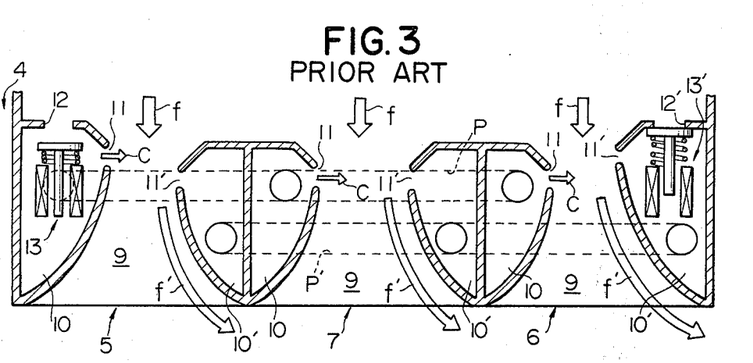
FIG. 3 is a horizontal cross sectional view of the prior-art nozzle assembly illustrated in FIG. 2, the cross section being taken on a plane indicated by lines III—III in FIG. 2.

When, now, the source of forced flow of air such as the motor-driven fan is in operation, air is circulated through the duct 8 and enters each of the nozzle sections 5, 6 and 7 as indicated by arrows f in FIG. 3. If, in this instance, the first solenoid-operated control valve 13 is held in a condition allowing the opening 12 to open and concurrently the second solenoid-operated control valve 13' is held in a condition closing the opening 12' as shown, air in the duct 8 enters not only the respective fluid dispensing passageways 9 of the first, second and third nozzle sections, 5, 6 and 7 but also the lefthand control fluid chamber 10 of the first nozzle section 5 through the opening 12. The air thus admitted into the lefthand control fluid chamber 10 of the first nozzle section 5 is partially injected into the fluid dispensing passageway 9 of the first nozzle section 5 through the slot 11 and partially directed into the first control fluid distribution passageway P. The air directed into the fluid distribution passageway P is distributed into the respective lefthand control fluid chambers 10 of the second and third nozzle sections 6 and 7 and is injected into the fluid dispensing passageway 9 of each of the second and third nozzle sections 5 and 6 through the slot 11 of each of the nozzle sections 5 and 6. A jet of air is in this fashion injected from the lefthand control fluid chamber 10 into the fluid dispensing passageway 9 through the slot 11 in each of the nozzle sections 5, 6 and 7 as indicated by arrows c and causes the flow of air in the fluid dispensing passageway 9 to deflect toward the righthand control fluid chamber 10' of each nozzle section as indicated by arrows f'. When, on the other hand, the first solenoid-operated control valve 13 is held in a condition closing the opening 12 of the first nozzle section 5 and the second solenoid-operated control valve 13' is held in a condition allowing the opening 12' of the second nozzle section 6 to open, air is injected from the righthand control fluid chamber 10' into the fluid dispensing passageway 9 through the slot 11' in each of the nozzle sections 5, 6 and 7. Under these conditions, the flow of air in the fluid dispensing passageway 9 in each of the nozzle sections 5, 6 and 7 is caused to deflect toward the lefthand control fluid chamber 10 of each nozzle section, as will be readily understood on the analogy of the above description. When, furthermore, both of the first and second solenoid-operated control valves 13 and 13' are held in the conditions closing the openings 12 and 12', respectively, air is permitted to flow straight forward through the fluid dispensing passageway 9 of each of the nozzle sections 5, 6 and 7.

The prior-art nozzle 2 of the nature hereinbefore described is thus capable of selectively producing a rightwardly deflected flow of air or a leftwardly deflected flow of air through the fluid dispensing passageway 9 of each of the nozzle sections 5, 6 and 7 thereof by operating the control valves 13 and 13' in such a manner as to allow one of the openings 12 and 12' to be open and to cause the other of the openings 12 and 12' to close. By operating the control valves 13 and 13' appropriately, the air discharged from the nozzle 2 can therefore be distributed uniformly on horizontal planes level with the nozzle 2 throughout the space to be air conditioned. By reason of the construction of the nozzle structure 4, however, the nozzle 2 has a drawback in that the air to be discharged therefrom can not be deflected vertically and for this reason can not be distributed uniformly in vertical directions within the space to be air conditioned. The present invention contemplates elimination of such a drawback encountered in a nozzle assembly of the described general nature.

DESCRIPTION OF A PREFERRED EMBODIMENT

Figure 4:
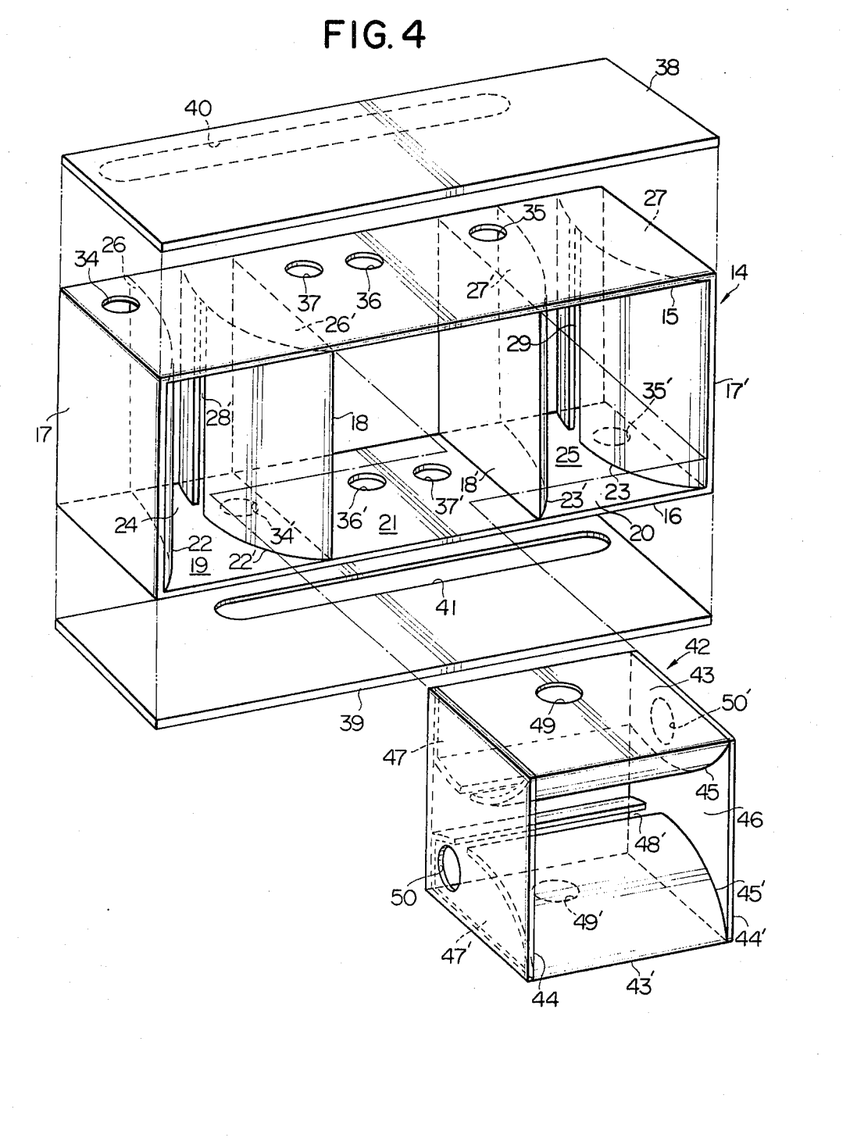
FIG. 4 is an exploded perspective view showing the combination of a housing structure and a nozzle unit forming part of a preferred embodiment of a multi-directional nozzle assembly according to the present invention.
Figure 5:
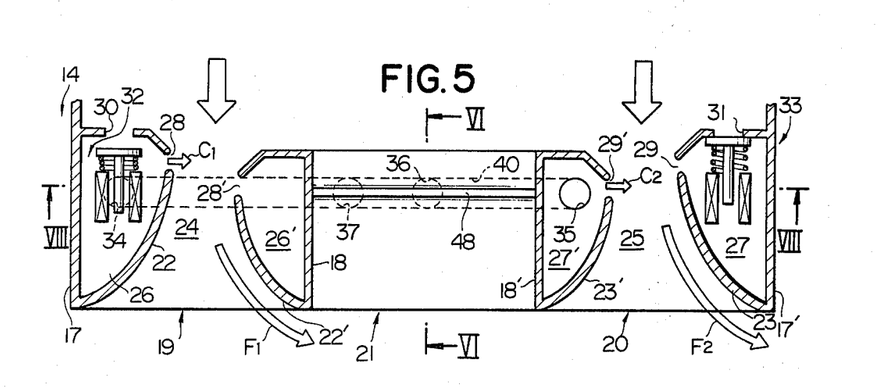
FIG. 5 is a horizontal cross sectional view of the embodiment of the nozzle assembly according to the present invention.

Referring to FIGS. 4 and 5 of the drawings, a nozzle assembly embodying the present invention comprises a housing structure 14 having a fore-and-aft direction in which the air to be discharged from the nozzle assembly is to flow therethrough and a lateral direction perpendicular to the fore-and-aft direction. The housing structure 14 comprises upper and lower walls 15 and 16 vertically spaced apart in parallel from each other and a pair of vertical side walls 17 and 17' horizontally spaced apart in parallel from each other in a lateral direction of the housing structure 14 and connecting the upper and lower walls 15 and 16 together at their respective side ends. The housing structure 14 further comprises at least two vertical partition walls 18 and 18' parallel with the side walls 17 and 17' and horizontally spaced apart from each other and inwardly from the side walls 17 and 17', respectively. Thus, the housing structure 14 has at least three hollow sections consisting of a first section 19 formed between the lefthand side wall 17 and the lefthand partition wall 18, a second section 20 formed between the righthand side wall 17' and the righthand partition wall 18', and a third section 21 formed between the two partition walls 17 and 17' as shown. Each of the first, second and third sections 19, 20 and 21 has fluid inlet and outlet ends at the rear and front ends, respectively, of the section in a fore-and-aft direction of the housing structure 14. The third section 21 in particular is equally sized in width and height.

The housing structure 14 further comprises a pair of nozzle walls 22 and 22' in the first section 19 and a pair of nozzle walls 23 and 23' in the second section 20 thereof. The nozzle walls 22 and 22' are horizontally spaced apart from each other in a lateral direction of the housing structure 14 and depart wider away from each other as the walls 22 and 22' approach the front end of the section 19. Thus, the nozzle walls 22 and 22' form therebetween a fluid dispensing passageway 24 having a horizontal cross section flaring toward the front end of the section 19. The fluid dispensing passageway 24 is open at the rear and front ends, viz., the fluid inlet and outlet ends of the first section 19 as will be clearly seen from FIG. 5. Similarly, the nozzle walls 23 and 23' are horizontally spaced apart from each other in a lateral direction of the housing structure 14 and depart wider away from each other as the walls 23 and 23' approach the front end of the section 20. The nozzle walls 23 and 23' thus form therebetween a fluid dispensing passageway 25 which has a horizontal cross section flaring toward the front end of the section 20. The fluid dispensing passageway 25 of the second section 20 is also open at the rear and front ends, viz., the fluid inlet and outlet ends of the section 20. The nozzle walls 22 and 22' further form a pair of control fluid chambers consisting of a first control fluid chamber 26 defined between the nozzle wall 22 and lefthand side wall 17 and a second control fluid chamber 26' defined between the nozzle wall 22' and the lefthand partition wall 18. Likewise, the nozzle walls 23 and 23' further form a pair of control fluid chambers consisting of a first control fluid chamber 27 defined between the nozzle wall 23 and the righthand side wall 17' and a second control fluid chamber 27' defined between the nozzle wall 23' and the righthand partition wall 18'.

The nozzle walls 22 and 22' are formed with vertically elongated slots 28 and 28' extending between the respective inner faces of the upper and lower walls 15 and 16 and providing communicaton between the fluid dispensing passageway 24 and the first and second control fluid chambers 26 and 26', respectively. The slots 28 and 28' are open to the fluid dispensing passageway 24 in lateral directions of the housing structure 14. The nozzle walls 23 and 23' are also formed with vertically elongated slots 29 and 29' providing communication between the fluid dispensing passageway 25 and the first and second control fluid chambers 27 and 27', respectively, and open to the passageway 25 in lateral directions of the housing structure 14.

The housing structure 14 further comprises rear wall portions respectively defining the rear ends of the four control chambers 26, 26', 27 and 27'. The rear end portions at the rear ends of the first control chambers 26 and 27 are formed with openings 30 and 31, respectively, through which the control fluid chambers 26 and 27 are open at the rear ends, viz., fluid inlet ends of the sections 19 and 20, as will be seen from FIG. 5. Within these control fluid chambers 26 and 27 are provided first and second solenoid-operated control valve units 32 and 33, respectively, each adapted to move into and out of a position closing the associated one of the openings 30 and 31. Though not shown in the drawings, the solenoid-operated valve units 32 and 33 are electrically connected in parallel to a suitable power source across suitable switches respectively connected in series with the valve units.

The housing structure 14 has formed in its upper wall 15 an opening 34 downwardly open to the first control fluid chamber 26, an opening 35 downwardly open to the first control fluid chamber 27' and openings 36 and 37 downwardly open to the third section 21. The housing structure 14 further has formed in its lower wall 16 an opening 34' upwardly open to the second control fluid chamber 26', an opening 35' upwardly open to the second control fluid chamber 27 of the second section 20, and openings 36' and 37' upwardly open to the third section 21.

As shown in FIG. 4, the housing structure 14 further comprises an upper end plate 38 securely attached to the outer face of the upper wall 15 and a lower end plate 39 securely attached to the outer face of the lower wall 16. The upper end plate 38 has formed on its inner side an elongated depression 40 having one end portion located above the opening 34 and the other end portion located above the opening 35 in the upper wall 15. The elongated depression 40 further has intermediate portions located above the openings 36 and 37 in the upper wall 15 so that all the openings 34, 35, 36 and 37 are open to the depression 40. Similarly, the lower end plate 39 has formed on its inner side an elongated depression 41 having one end portion located below the opening 34' and the other end portion located below the opening 35' in the lower wall 16. The elongated depression 41 also has intermediate portions located below the openings 36' and 37' in the lower wall 16 so that all the openings 34', 35', 36' and 37' are open to the depression 41. Thus, the depression 40 constitutes a passageway providing communication from the first control fluid chamber 26 to the second control fluid chamber 27' through the openings 34 and 35 and further to the third section 21 through one of the openings 36 and 37. Similarly, the depression 41 constitutes a passageway providing communication from the second control fluid chamber 26' to the first control fluid chamber 27 through the openings 34' and 35' and further to the third section 21 through one of the openings 36' and 37', as will be understood more clearly as the description proceeds.

The nozzle assembly embodying the present invention further comprises a detachable nozzle unit 42 having a first pair of outer walls 43 and 43' spaced apart from each other and a second pair of outer walls 44 and 44' spaced apart from each other and perpendicular to the first pair of outer walls 43 and 43' as will be best seen from FIG. 4. The individual outer walls 43, 43', 44 and 44' are sized so that the nozzle unit 42 as a whole can be snugly fitted in the third section 21 of the housing structure 14 with one pair of parallel outer walls received on the inner faces of the upper and lower walls 15 and 16, respectively, and the other pair of parallel outer walls received on the inner faces of the partition walls 18 and 18', respectively. The nozzle unit 42 has rear and front ends at the rear and front or fluid inlet and outlet ends, respectively, of the third section 21 and, thus, has fore-and-aft and lateral directions in fore-and-aft and lateral directions, respectively, of the housing structure 14.

Figure 6:
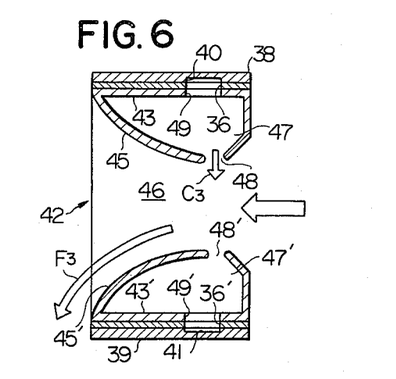
FIG. 6 is a vertical sectional view of the nozzle assembly embodying the present invention, the cross section being taken along lines VI—VI in FIG. 5.

As will be better seen from FIG. 6 of the drawings, the nozzle unit 42 further has a pair of nozzle walls 45 and 45' which are spaced apart from each other in a direction normal to the first pair of outer walls 43 and 43' and which depart wider away from each other as the nozzle walls 45 and 45' approach the front end of the nozzle unit 42. The nozzle walls 45 and 45' thus form therebetween a fluid dispensing passageway 46 having a cross section flaring toward the front end of the nozzle unit 42. The fluid dispensing passageway 46 is open at the rear and front ends of the nozzle unit 42. The nozzle walls 45 and 45' further form a pair of control fluid chambers 47 and 47' one of which is defined between the nozzle wall 45 and one of the first pair of outer walls 43 and 43' and the other of which is defined between the nozzle wall 45' and the other of the first pair of outer walls 43 and 43'.

Figure 7:
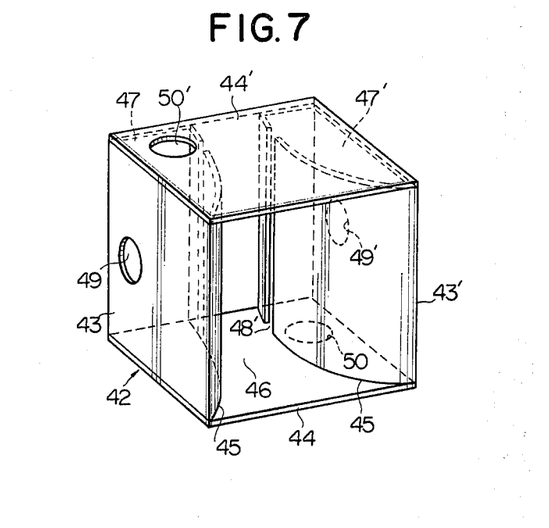
FIG. 7 is a perspective view showing the nozzle unit which forms part of the nozzle assembly embodying the present invention and which is held in a position different from the position of the nozzle unit indicated in FIG. 4.

The nozzle walls 45 and 45' are respectively formed with elongated slots 48 and 48' extending between the respective inner faces of the second pair of outer walls 44 and 44' and providing communication between the fluid dispensing passageway 46 and the control fluid chambers 47 and 47', respectively. The slots 48 and 48' are open to the fluid dispensing passageway 46 in directions normal to the first pair of outer walls 43 and 43'. Furthermore, the first pair of outer walls 43 and 43' are formed with openings 49 and 49', respectively, while the second pair of outer walls 44 and 44' are formed with openings 50 and 50', respectively. The openings 49 and 49' are open to the control fluid chambers 47 and 47', respectively. While the openings 50 and 50' are open to the control fluid chambers 47' and 47, respectively. Furthermore, the openings 49 and 49' are located to be in registry with the openings 36 and 36', respectively, when the nozzle unit 42 has in the third section 21 a first position having its outer walls 43 and 43' received on the inner faces of the upper and lower walls 15 and 16, respectively, as will be seen from FIG. 4. On the other hand, the openings 50 and 50' are located to be in registry with the openings 37' and 37, respectively, when the nozzle unit 42 has in the third section 21, a second position having its second pair of outer walls 44' and 44 received on the inner faces of the upper and lower walls 15 and 16, respectively, as will be gathered from the illustrations of FIGS. 4 and 7.

The nozzle assembly described hereinbefore forms part of a fluid dispensing duct system having incorporated therein suitable forced-flow inducing means such as a power-driven fan located upstream of the nozzle assembly, though not shown in the drawings. When such forced to flow inducing means is in operation, air under pressure is forced to flow through the duct system and enters the respective fluid dispensing passageways 24 and 25 of the first and second sections 19 and 20 and the fluid dispensing passageway 46 in the nozzle unit 42.

If, in this instance, the nozzle unit 42 is fitted in the first position thereof in the third section 21, the openings 49 and 49' in the first pair of outer walls 43 and 43', respectively, are held in registry with the openings 36 and 36', respectively, in the upper and lower walls 15 and 16.

If, under these conditions, the first solenoid-operated control valve unit 32 is held in a condition allowing the opening 30 to be open and the second solenoid-operated control valve unit 33 is held in a condition closing the opening 31 as shown in FIG. 5, a forced flow of air at the rear fluid inlet end of the first section 19 is admitted not only into the fluid dispensing passageway 24 but through the opening 30 into the first control fluid chamber 26. The air thus admitted into the first control fluid chamber 26 enters the depression 40 through the opening 34 and is distributed by way of the depression 40 into the second control fluid chamber 27' through the opening 35 and into the control fluid chamber 47 through the opening 36 and the opening 49. The air thus entering the control fluid chamber 26 is injected into the fluid dispensing passageway 24 through the slot 28 in a lateral direction of the housing structure 14. Likewise, the air admitted into the control fluid chamber 27' is injected into the fluid dispensing passageway 25 through the slot 29'. The flows of air passing forwardly through the fluid dispensing passageways 24 and 25 are therefore forced to deflect toward the righthand nozzle walls 22' and 23, respectively, by the jet streams of air spurting from the slots 28 and 29' as indicated by arrows $C_1$ and $C_2$, respectively, in FIG. 5. The flows of air discharged from the fluid dispensing passageways 24 and 25 are in this fashion deflected rightwardly of the housing structure 14 when viewed from the front of the housing structure 14 as indicated by arrows $F_1$ and $F_2$, respectively, in FIG. 5.

On the other hand, the air admitted into the control fluid chamber 47 is injected downwardly into the fluid dispensing passageway 46 through the slot 48 in the upper nozzle wall 45. The flow of air passing forwardly through the fluid dispensing passageway 46 of the nozzle unit 42 is thus caused to deflect downwardly toward the lower nozzle wall 45' by the jet stream of air spurting from the slot 48 as indicated by arrow $C_3$ in FIG. 6. It therefore follows that the flow of air discharged from the nozzle unit 42 is deflected downwardly of the housing structure 14 as indicated by arrow $F_3$ in FIG. 6.

Figure 8:
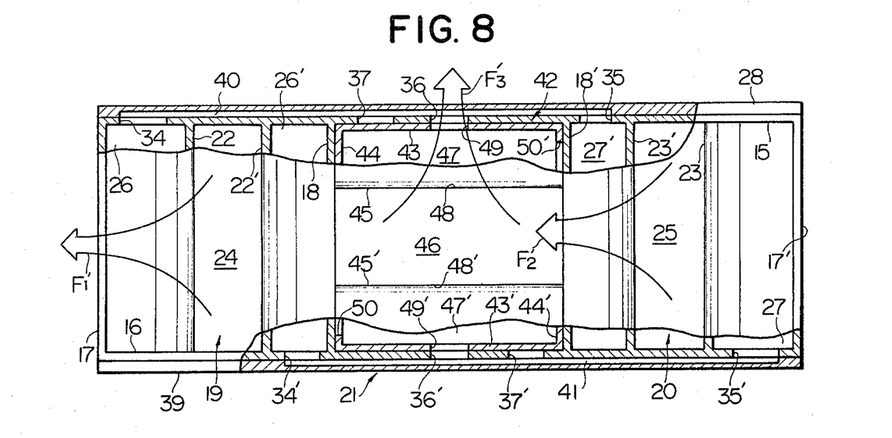
FIG. 8 is a vertical sectional view of the nozzle assembly embodying the present invention, the section being taken along lines VIII—VIII in FIG. 5.

If the first solenoid-operated control valve unit 32 is then de-energized to close the opening 30 and the second solenoid-operated control valve unit 33 is actuated to allow the opening 31 to be open, a forced flow of air at the rear fluid inlet end of the second section 20 is admitted into the first control fluid chamber 27. The air thus admitted into the first control fluid chamber 27 enters the depression 41 in the lower end plate 39 through the opening 35' in the lower wall 16 and is distributed by way of the depression 41 into the second control chamber 26' of the first section 19 through the opening 34' and into the control fluid chamber 47' of the nozzle unit 42 through the opening 36' in the lower wall 16 of the housing structure 14 and the opening 49' in the outer wall 43' of the nozzle unit 42. The air thus entering the control fluid chamber 27 of the second section 20 is injected into the fluid dispensing passageway 25 through the slot 29 in the righthand nozzle wall 23 of the section 20 in a lateral direction of the housing structure 14. Likewise, the air admitted into the control fluid chamber 26' of the first section 19 is injected into the fluid dispensing passageway 24 of the section 19 through the slot 28' in the righthand nozzle wall 22' of the first section 19. The flows of air passing forwardly through the fluid dispensing passageways 24 and 25 are thus forced to deflect toward the lefthand nozzle walls 22 and 23' of the sections 19 and 20, respectively, by the jet streams of air spurting from the slots 28' and 29 as indicated by arrows $F_1'$ and $F_2'$, respectively, in FIG. 8 of the drawings.

On the other hand, the air admitted into the control fluid chamber 47' of the nozzle unit 42 is injected into the fluid dispensing passageway 46 through the slot 48' in the lower nozzle wall 45' of the nozzle unit 42. The flow of air passing forwardly through the fluid dispensing passageway 46 of the nozzle unit 42 is therefore caused to deflect upwardly toward the upper nozzle wall 45 by the jet stream of air spurting from the slot 48'. The flow of air discharged from the nozzle unit 42 is therefore deflected upwardly of the housing structure 14 as indicated by arrow $F_3'$ in FIG. 8.

If the nozzle unit 42 is fitted in the second position thereof into the third section 20 of the housing structure 14, the nozzle unit 42 functions similarly to each of the first and second sections 19 and 20. When the nozzle unit 42 is held in the second position thereof in the third section 21, the openings 50 and 50' in the outer walls 44 and 44' of the nozzle unit 42 are held in registry with the openings 37' and 37, respectively, in the lower and upper walls 16 and 15 of the housing structure 14. Furthermore, the nozzle walls 45 and 45' of the nozzle unit 42 are horizontally spaced apart from each other and depart wider away from each other as the walls 42 and 42' approach the front end of the nozzle unit 42. If, under these conditions, the first solenoid-operated control valve unit 32 is held in the condition allowing the opening 30 to be open with the second solenoid-operated control valve unit 33 held in the condition closing the opening 31, a forced flow of air admitted into the first control fluid chamber 26 enters the depression 40 in the upper end plate 38 through the opening 34 in the upper wall 15 of the housing structure 14 as previously discussed. The air thus admitted into the depression 40 is distributed into the second control fluid chamber 27' of the second section 20 through the opening 35 in the upper wall 15 of the housing structure 14 and further into the control fluid chamber 47' of the nozzle unit 42 through the opening 37 in the upper wall 15 of the housing structure 14 and the opening 50'. The flow of air passed forwardly through the fluid dispensing passageway 46 is therefore forced to deflect rightwardly from the passageway 46 similarly to the flows of air being discharged from the respective fluid dispensing passageways 24 and 25. If, on the other hand, the first solenoid-operated control valve unit 32 is held in the condition closing the opening 30 and concurrently the second solenoid-operated valve unit 33 is held in the condition allowing the opening 31 to be open, a forced flow of air is admitted into the depression 41 in the lower end plate 39 through the opening 35' in the lower wall 16 of the housing structure 14 as previously discussed. The air thus admitted into the depression 41 is distributed into the control fluid chamber 47' of the nozzle unit 42 through the opening 37' in the lower wall 16 of the housing structure 14 and the opening 50. The flow of air passed forwardly through the fluid dispensing passageway 46 is therefore forced to deflect leftwardly from the passageway 46 similarly to the flows of air being discharged from the respective fluid dispensing passageways 24 and 25 of the first and second sections 19 and 20 of the housing structure 14.

In the hereinbefore described embodiment of a nozzle assembly according to the present invention, the switch means for the first and second solenoid-operated control valve units 32 and 33 may be incorporated into a control circuit (not shown) operative to have the valve units 32 and 33 actuated alternately at predetermined intervals or in response to a predetermined temperature detected in the space to be air conditioned. While, furthermore, it has been described that only one detachable nozzle unit is provided between the first and second sections 19 and 20 of the housing structure 14, two more nozzle units may be provided either in a common third section or respectively in so many intermediate sections formed between the first and second sections.

What is claimed is:

1. A multi-directional nozzle assembly for a fluid dispensing duct system, comprising:
   a housing structure having first, second and third directions perpendicular to one another and at least three sections arranged in the first direction of the housing structure and consisting of first and second sections respectively constituted by the outermost two of the three sections and a third section constituted by the remaining one of the three sections, each of the first and second sections being arranged with a fluid dispensing passageway extending in a direction parallel with the second direction of the housing structure and first and second control fluid chambers spaced apart from each other across the fluid dispensing passageway in a direction parallel with the first direction of the housing structure, the housing structure further having in each of the first and second sections a pair of slots providing communication between the fluid chambers, respectively, of each of the first and second sections in directions parallel with said first direction of the housing structure, a fluid inlet opening for allowing the first control fluid chamber to be open at the fluid inlet end of each of the first and second sections, a first fluid distribution passageway between the first control fluid chamber of the first section and the second control fluid chamber of the second section, a second fluid distribution passageway providing communication between the first control fluid chamber of the second section and the second control fluid chamber of the first section, a first pair of openings each for providing communication between said first fluid distribution passageway and said third section and a second pair of openings each for providing communication between said second fluid distribution passageway and said third section so that a flow of fluid to be discharged from the fluid dispensing passageway is to be deflected by the slots of the housing structure in a plane parallel with the first and second directions of the housing structure, two control valve units each provided in conjunction with one of the control fluid chambers of each of the first and second sections and operative to regulate the direction in which a flow of fluid to be passed through the fluid dispensing passageway of each of the first and second sections is to be discharged therefrom, and a nozzle unit detachably fitted in the third section of the housing structure and having a fluid dispensing passageway extending in a direction parallel with the second direction of the housing structure, a pair of control fluid chambers spaced apart from each other across the fluid dispensing passageway of the nozzle unit and a pair of slots providing communication between the fluid dispensing passageway and the control fluid chambers of the nozzle unit in directions parallel with one of the first and third directions of the housing structure, a first pair of openings each for providing communication between said first fluid distribution passageway and one of the control fluid chambers of the nozzle unit, and a second pair of openings each for providing communication between said second fluid distribution passageway and the other of the control fluid chambers of the nozzle unit, the nozzle unit being assumable in the third section a first position in which a flow of fluid to be passed through the fluid dispensing passageway of the nozzle unit is to be deflected by the solts of said nozzle unit in a plane parallel with the second and third directions of the housing structure and a second position in which a flow of fluid to be passed through the fluid dispensing passageway of the nozzle unit is to be deflected in a plane parallel with the first and second directions of the housing structure.

2. A multi-directional nozzle assembly for a fluid dispensing duct system, comprising a housing structure having first, second and third directions perpendicular to one another and at least three hollow sections separate from each other in the first direction of the housing structure and consisting of first and second sections respectively constituted by the outer two of the three sections and a third section constituted by the remaining one of the three sections, each of the sections having fluid inlet and outlet ends in directions parallel to the second direction of the housing structure, each of the first and second sections having a fluid dispensing passageway extending between the fluid inlet and outlet ends of the section and having on a plane parallel with the first and second directions of the housing structure a cross section flaring toward the fluid outlet end of the section and first and second control fluid chambers spaced apart from each other across the fluid dispensing passageway in direction parallel with the first direction of the housing structure, the respective first control fluid chambers of the first and second sections being disposed remoter from said third section than the respective second control fluid chambers of the first and second sections in the first direction of the housing structure, the housing structure further having in each of the first and second sections a pair of slots providing communication between the fluid dispensing passageway and the first and second control fluid chambers, respectively, of each of the first and second sections in directions parallel with said first direction of the housing structure, a fluid inlet opening for allowing the first control fluid chamber to be open at the fluid inlet end of each of the first and second sections, a first fluid distribution passageway providing communication between the first control fluid chamber of the first section and the second control fluid chamber of the second section, a second fluid distribution passageway providing communication between the first control fluid chamber of the second section and the second control fluid chamber of the first section, a first pair of openings each for providing communication between said first fluid distribution passageway and said third section and a second pair of openings each for providing communication between said second fluid distribution passageway and said third section, a first valve unit provided in conjunction with said first section and operative to close the fluid inlet opening of the first section, a second valve unit provided in conjunction with said second section and operative to close the fluid inlet opening of the second section, and at least one nozzle unit detachably fitted in said third section and having fluid inlet and outlet ends at the fluid inlet and outlet ends, respectively, of the third section, a fluid dispensing passageway extending between the fluid inlet and outlet ends of the nozzle unit and having on a plane parallel with the first and second directions and the second and third directions of the housing structure a cross section flaring toward the fluid outlet end of the nozzle unit, a pair of control fluid chambers spaced apart from each other across the fluid dispensing passageway of the nozzle unit in direction parallel with one of the first and third directions of the housing structure, a pair of slots providing communication between the fluid dispensing passageway and the control fluid chambers of the nozzle unit in directions parallel with one of the first and third directions of the housing structure, a first pair of openings each for providing communication between said first fluid distribution passageway and one of the control fluid chambers of the nozzle unit, and a second pair of openings each for providing communication between said second fluid distribution passageway and the other of the control fluid chambers of the nozzle unit, the nozzle unit being detachable from the housing structure and selectively assumable in the third section a first position having the fluid dispensing passageway of the nozzle unit flaring toward the fluid outlet end of the nozzle unit on a plane parallel with the second and third directions of the housing structure and a second position having the fluid dispensing passageway of the nozzle unit flaring toward the fluid outlet end of the nozzle unit on a plane parallel with the first and second directions of the housing structure.

* * * * *